US011681806B2

(12) United States Patent
Boivie et al.

(10) Patent No.: US 11,681,806 B2
(45) Date of Patent: Jun. 20, 2023

(54) PROTECTING AGAINST OUT-OF-BOUNDS BUFFER REFERENCES

(71) Applicant: International Business Machines Corporation, Armonk, NY (US)

(72) Inventors: Richard H. Boivie, Monroe, CT (US); Alper Buyuktosunoglu, White Plains, NY (US); Tong Chen, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 602 days.

(21) Appl. No.: 16/601,633

(22) Filed: Oct. 15, 2019

(65) Prior Publication Data
US 2021/0110040 A1    Apr. 15, 2021

(51) Int. Cl.
*G06F 9/30* (2018.01)
*G06F 21/57* (2013.01)
*G06F 9/38* (2018.01)
*G06F 21/52* (2013.01)
*G06F 21/54* (2013.01)

(52) U.S. Cl.
CPC ............ *G06F 21/57* (2013.01); *G06F 9/3004* (2013.01); *G06F 9/30101* (2013.01); *G06F 9/3818* (2013.01); *G06F 9/3836* (2013.01); *G06F 21/52* (2013.01); *G06F 21/54* (2013.01); *G06F 2221/034* (2013.01)

(58) Field of Classification Search
CPC .......... G06F 21/57; G06F 21/52; G06F 21/54; G06F 9/30076; G06F 9/3836; G06F 9/3818; G06F 9/30101; G06F 9/3004
See application file for complete search history.

(56) References Cited

U.S. PATENT DOCUMENTS

| 6,014,723 | A | 1/2000 | Tremblay |
| 6,343,375 | B1 | 1/2002 | Gupta |
| 7,210,118 | B2 | 4/2007 | Hastings |
| 7,836,434 | B1 | 11/2010 | Boucher |
| 8,067,948 | B2 * | 11/2011 | Sequine .................. G01D 5/24 710/305 |

(Continued)

OTHER PUBLICATIONS

Aingaran et al., "Software in Silicon in the Oracle SPARC M7 Processor", ORACLE, Copyright © 2016, Oracle and/or its affiliates, 31 pages.

(Continued)

*Primary Examiner* — Corey S Faherty
(74) *Attorney, Agent, or Firm* — Stephen R. Yoder (57) ABSTRACT

In an approach to protecting against out-of-bounds buffer references, an apparatus comprises one or more processor cores and a bounds-checking functional unit in each processor core configured to manage bounds information for one or more memory buffers. When a buffer is allocated, an address range of the buffer is stored. When a pointer is assigned an address within the address range of the buffer, the address range of the buffer is associated with the pointer. When the pointer is used to compute an address for an operation, whether the address for the operation is within the address range associated with the pointer is determined. If the address is not within the address range associated with the pointer, signaling that an error has occurred.

20 Claims, 8 Drawing Sheets

(56) References Cited

U.S. PATENT DOCUMENTS

| | | | |
|---|---|---|---|
| 8,261,251 B2 | 9/2012 | Kielstra | |
| 11,188,470 B2 * | 11/2021 | Peles | G06F 21/52 |
| 2018/0373871 A1 * | 12/2018 | Lemay | G06F 21/554 |
| 2019/0227953 A1 * | 7/2019 | Trivedi | G06F 12/145 |
| 2019/0370001 A1 * | 12/2019 | Teyssier | G06F 9/3806 |
| 2020/0125770 A1 * | 4/2020 | LeMay | G06F 12/0207 |

OTHER PUBLICATIONS

Lam et al., "Checking Array Bound Violation Using Segmentation Hardware", Proceedings of the 2005 International Conference on Dependable Systems and Networks (DSN'05) 0769522823/05, © 2005 IEEE, 10 pages.

Nagarakatte et al., "SoftBound: Highly Compatible and Complete Spatial Memory Safety for C", PLDI'09, Jun. 15-20, 2009, Dublin, Ireland, Copyright © 2009 ACM, 14 pages.

* cited by examiner

510 → 511 — Struct {
512 —     int b[100];
    float f1;
} a;

FIG. 5A

520 → 521 — while ( ) {
522 —     *p++ ;
523 —     checkBI bi, p
524 —     load p (or store p)
}

FIG. 5B

530 → 531 — checkBI bi, id
532 — while() {
    ...
533 —     load r, p, id
    ...
}

PROTECTING AGAINST OUT-OF-BOUNDS BUFFER REFERENCES

BACKGROUND

The present invention relates generally to the field of maintaining trusted computer platforms, and more particularly to protecting against out-of-bounds buffer references.

In the current state of computer programming technology, buffers are areas of memory set aside to hold data, often while moving it from one program routine to another, or between programs. Memory allocation is a process by which computer programs and services are assigned physical or virtual memory space from the memory of the computer. Memory allocation is the process of reserving a portion of the memory of the computer for the execution of programs and processes. It is also the process by which programs assign memory from an available pool of memory, or heap, to buffers which are used by the program to hold data. In the C programming language, dynamic memory is allocated from the heap using standard library functions. The two key dynamic memory functions are memory allocation, or malloc( ), and memory de-allocation, or free( ). The malloc( ) function takes a single parameter, which is the size of the requested memory area in bytes, and returns a pointer to the allocated memory. The free( ) function takes the pointer returned by malloc( ) and de-allocates the memory.

SUMMARY

Embodiments of the present invention disclose an apparatus for protecting against out-of-bounds buffer references. In one embodiment, the apparatus comprises one or more processor cores configured to process data; and a bounds-checking functional unit in each processor core configured to manage bounds information for one or more memory buffers.

Embodiments of the present invention disclose a method and a computer program product for protecting against out-of-bounds buffer references. In one embodiment, when a buffer is allocated, an address range of the buffer is stored. When a pointer is assigned an address within the address range of the buffer, the address range of the buffer is associated with the pointer. When the pointer is used to compute an address for an operation, whether the address for the operation is within the address range associated with the pointer is determined. If the address is not within the address range associated with the pointer, a signal indicates that an error has occurred.

DETAILED DESCRIPTION

Buffers are areas of memory set aside to hold data, often while moving it from one program routine to another, or between programs. A buffer overflow occurs when a program or process attempts to read or write more data to a fixed length block of memory, or buffer, than the buffer is allocated to hold. Since buffers are created with fixed bounds to contain a defined amount of data, the extra data can overwrite data values in memory addresses adjacent to the destination buffer. If this overwrites adjacent data or executable code, this may result in erratic program behavior, including memory access errors, incorrect results, and crashes. A buffer overflow can occur inadvertently, but it can also be caused, for example, by a malicious actor sending carefully crafted input to a program that overruns the allocated buffer. A malicious actor can also attempt to read past the end of a buffer in an attempt to read adjacent data.

Cybercriminals exploit buffer overflow vulnerabilities to alter the execution path of an application by overwriting parts of its memory. The malicious extra data may contain code in the form of new instructions to attack the vulnerable application that can result in unauthorized access to the system. Exploiting a buffer overflow allows an attacker to take control of the process. Buffer overflow always ranks high in the potential for damage to a susceptible system.

Whether a buffer overflow occurs inadvertently, or is caused by a malicious actor, the results can be erroneous behavior, a program crash, or a successful cyberattack. Although buffer overflows can occur in any programming environment where direct memory manipulation is allowed, programming languages like C and C++ are especially prone to these errors because they have no built-in protection against buffer overflow.

In an embodiment of the present invention, when a buffer is allocated (for example, through a variable declaration or a memory allocation), the compiler generates code that records the address range of the buffer. This is referred to as the bounds information (BI). The compiler generates instructions that perform the buffer allocation through a set of instructions and records the bounds information in a bounds register. The system tracks this information when arrays or pointer expressions are assigned to other variables in assignment statements. The bounds information in a bounds register is saved in a bounds table when a pointer to the buffer is stored to a memory location (since a compiler cannot keep track of buffer information across separately compiled source files) and the bounds information is retrieved when a pointer to the buffer is loaded from memory. Compiler analysis is used to reduce unnecessary stores of the bounds information to minimize any impact on performance. For example, if the compiler can determine that an entry to be stored already exists in the bounds table at runtime, then the store operation can be cancelled, to minimize performance impact.

The system checks at run-time whether an array reference is in-bounds or out-of-bounds and generates an interrupt if the reference is out-of-bounds. The interrupt is used, for example, to terminate a program and generate a stack trace so the cause of the out-of-bounds reference can be determined.

Storing the bounds information each time a buffer is allocated and checking the bounds information each time a buffer is accessed can lead to a reduction in system performance. In an embodiment, to reduce this performance impact, the tracking and checking of array bounds, and the generation of out-of-bounds interrupts, is performed on a separate, special-purpose bounds-checking functional unit. The bounds-checking functional unit is implemented on the processor core and is designed specifically for bounds checking.

Figure 1:
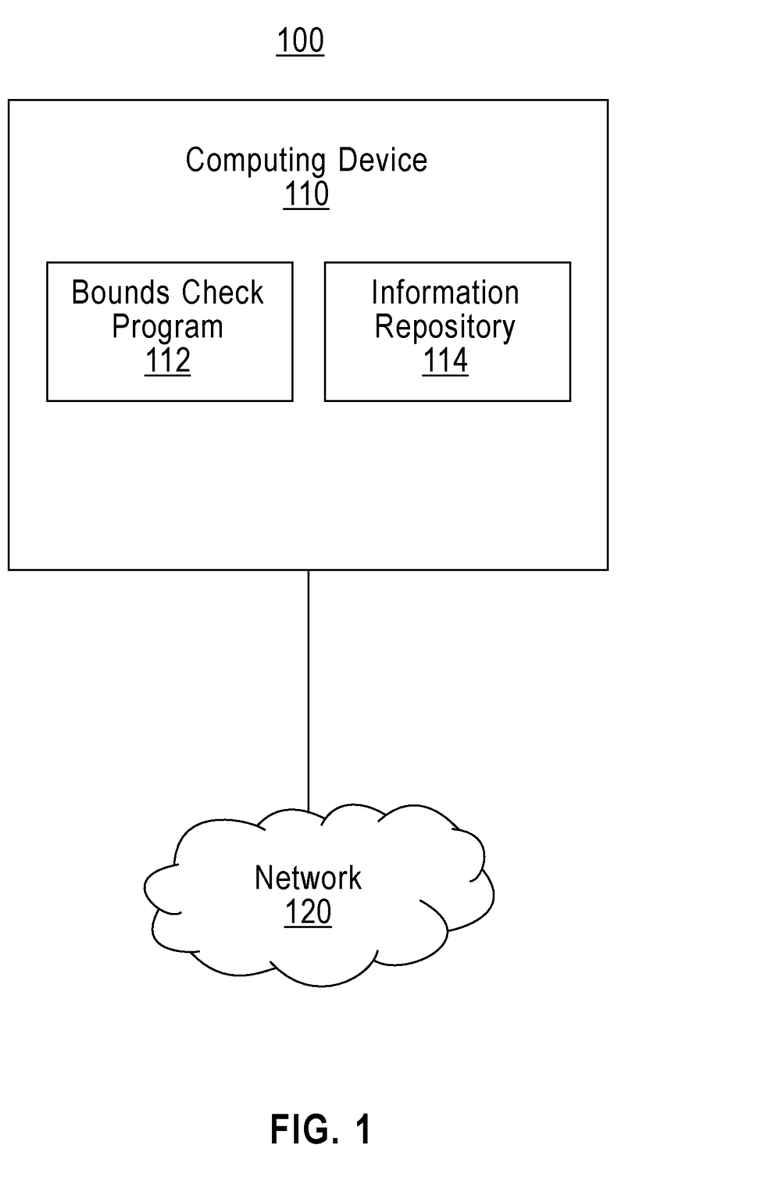
FIG. 1 is a functional block diagram illustrating a distributed data processing environment, in accordance with an embodiment of the present invention.

FIG. 1 is a functional block diagram illustrating a distributed data processing environment, generally designated 100, suitable for operation of bounds check program 112 in accordance with at least one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 110 connected to network 120. Network 120 can be, for example, a telecommunications network, a local area network (LAN), a wide area network (WAN), such as the Internet, or a combination of the three, and can include wired, wireless, or fiber optic connections. Network 120 can include one or more wired and/or wireless networks that are capable of receiving and transmitting data, voice, and/or video signals, including multimedia signals that include voice, data, and video information. In general, network 120 can be any combination of connections and protocols that will support communications between computing device 110 and other computing devices (not shown) within distributed data processing environment 100.

Computing device 110 can be a standalone computing device, a management server, a web server, a mobile computing device, or any other electronic device or computing system capable of receiving, sending, and processing data. In an embodiment, computing device 110 can be a laptop computer, a tablet computer, a netbook computer, a personal computer (PC), a desktop computer, a personal digital assistant (PDA), a smart phone, or any programmable electronic device capable of communicating with other computing devices (not shown) within distributed data processing environment 100 via network 120. In another embodiment, computing device 110 can represent a server computing system utilizing multiple computers as a server system, such as in a cloud computing environment. In yet another embodiment, computing device 110 represents a computing system utilizing clustered computers and components (e.g., database server computers, application server computers, etc.) that act as a single pool of seamless resources when accessed within distributed data processing environment 100.

In an embodiment, computing device 110 includes bounds check program 112. In an embodiment, bounds check program 112 is a program, application, or subprogram of a larger program for bounds checking for protecting against out-of-bounds buffer references. In an alternative embodiment, bounds check program 112 may be located on any other device accessible by computing device 110 via network 120.

In an embodiment, computing device 110 includes information repository 114. In an embodiment, information repository 114 may be managed by bounds check program 112. In an alternate embodiment, information repository 114 may be managed by the operating system of the device, alone, or together with, bounds check program 112. Information repository 114 is a data repository that can store, gather, compare, and/or combine information. In some embodiments, information repository 114 is located externally to computing device 110 and accessed through a communication network, such as network 120. In some embodiments, information repository 114 resides on computing device 110. In some embodiments, information repository 114 may reside on another computing device (not shown), provided that information repository 114 is accessible by computing device 110. Information repository 114 includes, but is not limited to, program data, buffer data, compiler data, bounds-checking data, raw data, and other data that is received by bounds check program 112 from one or more sources, and data that is created by bounds check program 112.

Information repository 114 may be implemented using any volatile or non-volatile storage media for storing information, as known in the art. For example, information repository 114 may be implemented with a tape library, optical library, one or more independent hard disk drives, multiple hard disk drives in a redundant array of independent disks (RAID), solid-state drives (SSD), or random-access memory (RAM). Similarly, information repository 114 may be implemented with any suitable storage architecture known in the art, such as a relational database, an object-oriented database, or one or more tables.

Figure 2:
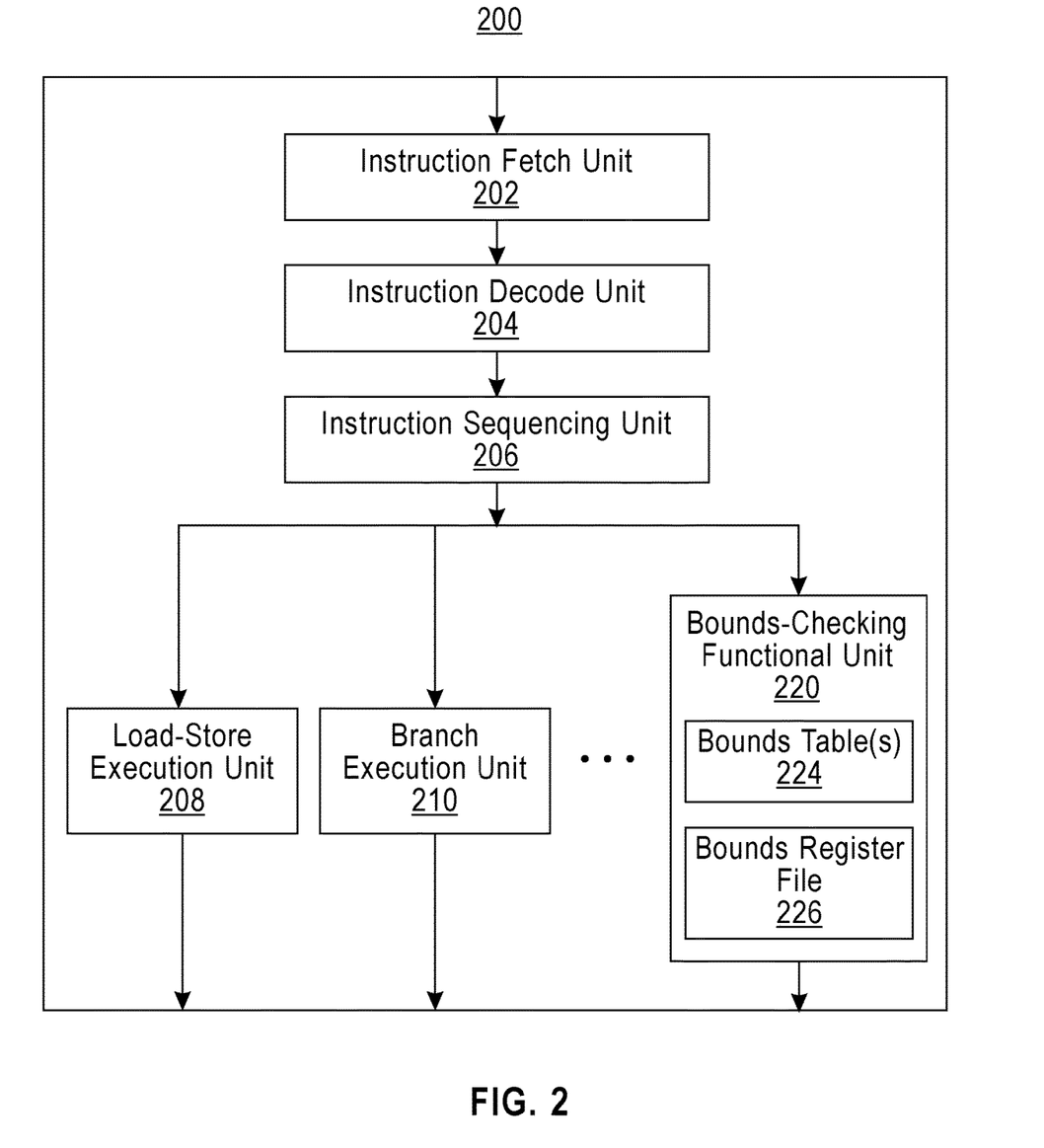
FIG. 2 is a functional block diagram illustrating a section of a typical instruction pipeline of a processor core, including a bounds-checking functional unit, a bounds table(s), and a bounds register file, in accordance with an embodiment of the present invention.

In an embodiment, computing device 110 includes bounds-checking functional unit 220, which includes bounds table(s) 224, and bounds register file 226, as described below.

FIG. 2 depicts a functional block diagram 200 illustrating a typical instruction pipeline of a processor core of computing device 110 executing within distributed data processing environment 100 of FIG. 1, and incorporating bounds-checking functional unit 220 in accordance with an embodiment of the present invention. It should be appreciated that the diagram depicted in FIG. 2 illustrates one possible arrangement of a typical instruction pipeline of a processor core incorporating bounds-checking functional unit 220. Many modifications to the depicted environment may be made by those skilled in the art without departing from the scope of the invention as recited by the claims.

In the depicted embodiment, instruction fetch unit 202 is a representation of a standard functional unit in a processor core that retrieves the next instruction to be executed from memory. No modifications to processor instruction fetch unit 202 with respect to a standard processor fetch unit are required in this embodiment. Instruction fetch unit 202 is shown for clarity only.

In the depicted embodiment, instruction decode unit 204 is a functional unit in a processor core that decodes the next instruction to be executed from memory. In the present invention, instruction decode unit 204 is modified to include decode support for new instructions required by bounds-checking functional unit 220. These new instructions are described below.

In the depicted embodiment, instruction sequencing unit 206 is a functional unit in a processor core that determines the order of the instructions to be executed by the processor. In a typical processor core, the instruction sequencing unit queues instructions to be issued to the various execution units, where each instruction is typically issued to one of the execution units. In the depicted embodiment, instruction sequencing unit 206 is modified to support sharing the issue queue for new instructions required by bounds-checking functional unit 220. In a typical embodiment, there are a plurality of execution units in the processor core to execute instructions. In the depicted embodiment, these execution units include load-store execution unit 208, which executes instructions to transfer data to and from memory, branch execution unit 210, which executes branch instructions to jump to a different location in the running program, and bounds-checking functional unit 220.

In the depicted embodiment, bounds-checking functional unit 220 operates as a functional unit to offload bounds information management operations, including bounds management and bounds checking, from the main processor core. These instructions store, retrieve, and check buffer bounds information to detect buffer overflow. In the depicted embodiment, bounds-checking functional unit 220 includes bounds table(s) 224, and bounds register file 226. In an embodiment, bounds-checking functional unit 220 contains one or more hardware bounds tables, for example, bounds table(s) 224, and a dedicated pool of hardware registers for bounds checking operations, for example, bounds register file 226. By providing this dedicated pool of hardware registers, register pressure on the main processor core is reduced. The hardware bounds table caches an in-memory bounds table, to improve performance of bounds-checking functional unit 220. Bounds-checking functional unit 220 keeps track of whether there is bounds information in the in-memory bound table. The hardware bounds table performs an associative lookup based on a pointer into a buffer.

In an embodiment, the main processor uses simultaneous multi-threading, and therefore bounds-checking functional unit 220 includes one hardware bounds table for each thread, and one in-memory bounds table for each thread. This isolates the buffer data of each thread from the buffer data of all other threads by separating the buffer data, including address, size, and buffer information.

When the bounds information for a given buffer is not found in the hardware bounds table, bounds-checking functional unit 220 searches the in-memory bounds table for the bounds information associated with the buffer that was not found in the hardware bounds table. The in-memory bounds table is inclusive of the contents of the hardware bounds table, i.e., the hardware bounds table is a subset of the in-memory bounds table. If the hardware bounds table is full when bounds-checking functional unit 220 needs to write a new entry, bounds-checking functional unit 220 replaces the contents of the hardware bounds table using the least recently used algorithm. This algorithm overwrites the least recently used entry in the hardware bounds table with the new entry that bounds-checking functional unit 220 needs to write into the table.

In an embodiment, the Instruction Set Architecture (ISA) of computing device 110 is modified to support bounds checking. The ISA is an abstract model of a computer from the programmer's perspective. In other words, ISA describes the instructions that are available to the programmer. In an embodiment, the ISA of computing device 110 is modified to include the following instructions.

The bounds information create instruction, createBI, creates an entry in a bounds register in the bounds register file. In an embodiment, the format of the instruction is createBI bi, lb, size. Lb is the lower bound of the buffer, i.e., the starting address of the memory allocated to the buffer. Size is the size of the buffer. The complete buffer encompasses the memory locations starting at the lower bound and extending to the memory address equal to the lower bound plus the size of the buffer minus one. Bi is the bounds information, which consists of the concatenation of the lb and the size parameters. This is the output, or return value, of the createBI instruction.

The bounds check instruction: checkBI, checks an address against the information in a bounds register. If the check finds that the address is outside the proper bounds of the buffer, the bounds-checking functional unit either directly triggers a trap based on the result (hardware interrupt) or the bounds-checking functional unit can set a condition code register to allow the program to test the condition code register through another instruction (software flag). In an embodiment, the format of the instruction is checkBI result, bi, addr. Bi is a register that contains the bounds information. Addr is the address that is to be checked to determine if it within the bounds specified in the bi register. Result (true or false) is the output, or return value, of the checkBI instruction. The checkBI instruction is only performed when a pointer is dereferenced, when the pointer value has to be correct.

The bounds information store instruction: storeBI, stores the bounds information into the hardware bounds table and the in-memory bounds table. In an embodiment, the format of the instruction is storeBI bi, key. Bi is the bounds information for a particular buffer. Key is a pointer into the buffer. In an embodiment, the key may point to the memory location of an offset location in the buffer. For example, the pointer may point to the 100th byte of the buffer. When the bounds information in a hardware bounds register needs to be stored in the hardware bounds table so the hardware bounds register can be re-used, the bounds-checking functional unit also stores the bounds information in the in-memory bounds table. When the pointer is loaded into a register at some later time, the key is used to re-load the corresponding bound information back into an appropriate hardware bounds register.

The bounds information load instruction: loadBI, loads information from the hardware bounds table into a bounds-information register. In an embodiment, the format of the instruction is loadBI bi, key, where key corresponds to a previously stored bounds information and bi is the bounds register that gets loaded with the previously stored bounds information.

In an embodiment, the operations createBI, loadBI, and storeBI are atomic operations. A problem can occur when two operations running in parallel utilize the same data and a disparity between the results of the operations occurs. An atomic operation is a program operation that runs to completion without interference from of any other process. During an atomic operation, a processor can perform several operations during a single uninterruptable instruction cycle. In this way, another input/output mechanism or processor cannot perform memory reading or writing tasks until the atomic operation has finished. This prevents corruption of the bounds information by another thread, as well as malicious code attempts to corrupt the bounds information.

Bounds check program 112 uses a modified compiler to insert the instructions for the bounds-checking functional unit. The modified compiler works on any code, with re-compilation, and not just on code written with buffer overflow protection included. In other words, existing code that was written without consideration for buffer overflow protection gains the benefit of this protection by recompiling the original source code with the modified compiler. The compiler is modified to generate code for the bounds-checking functional unit in addition to the code it generates for the main processor core. The bounds-checking functional unit code is transparent to the main processor. Therefore, if the code is executed on a processor that does not contain the bounds-checking functional unit, the specific bounds-checking functional unit instructions will become no-operation (NOP) instructions, and will not affect normal operation.

Figure 3:
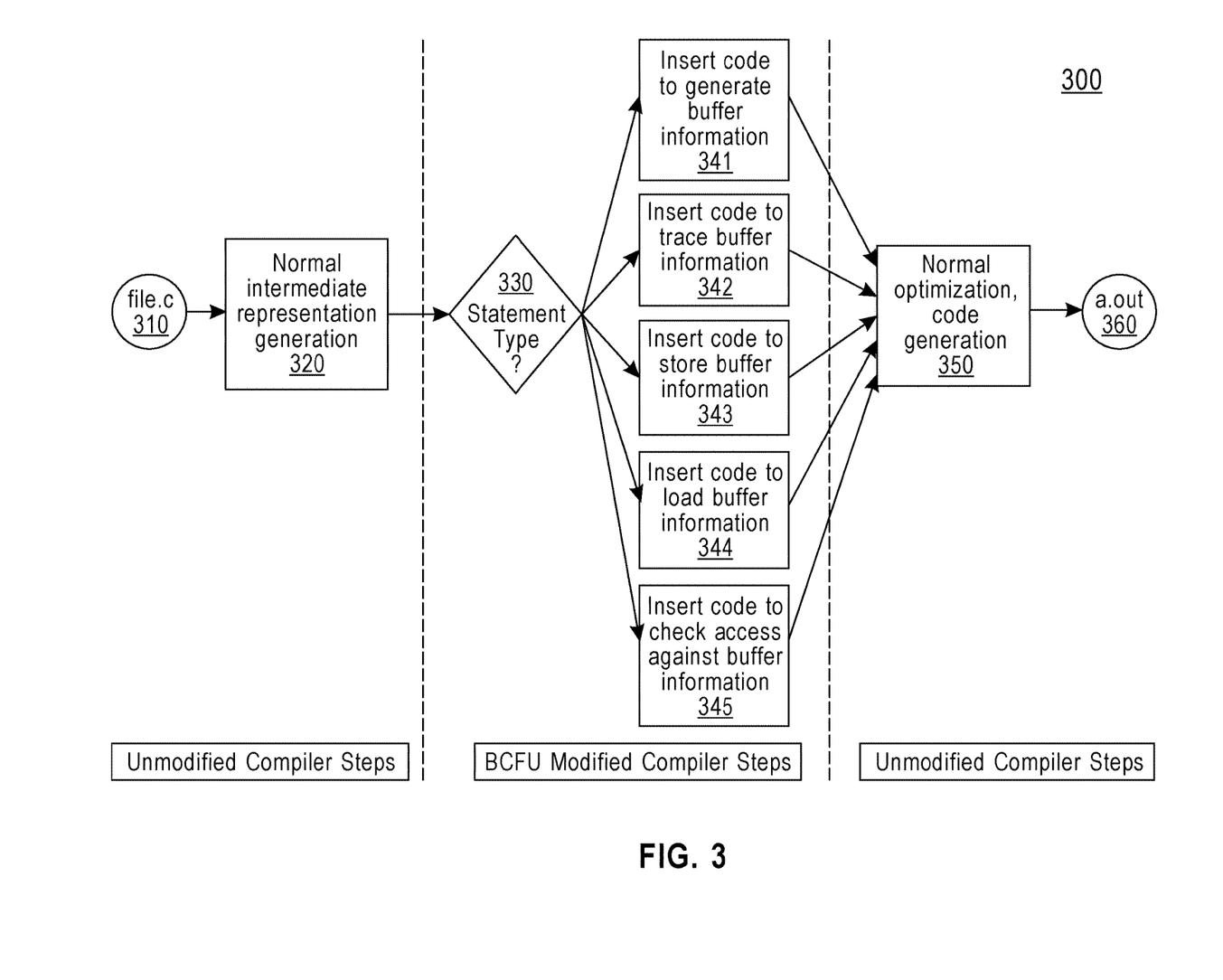
FIG. 3 is an example of the flow through a compiler modified to insert instructions to check for a buffer overflow, in accordance with an embodiment of the present invention.

FIG. 3 is an example of a compiler 300, for example, a C compiler, modified to check for a buffer overflow. In an embodiment, the compiler is modified to generate the specific instructions to execute in the bounds-checking functional unit to create, store, load, and check bounds information to detect an out-of-bounds buffer access. In an embodiment, the compiler receives the input file 310 and executes normal, unmodified operation steps until the compiler generates the intermediate representation, also known as the intermediate code generation, in step 320. At this point, the modified compiler checks for buffer instruction generation in step 330 and, if found, inserts the appropriate bounds-checking functional unit instructions into the code stream. It is important to note that the instructions generated in steps 330 and 341-345 are transparent to the main CPU. This allows the same code to execute on a processor with the bounds-checking functional unit, with bounds checking functionality, or on a processor without the bounds-checking functional unit, without bounds checking functionality.

If the buffer instruction is a variable creation or memory allocation, then the modified compiler inserts code to generate the bounds information (step 341). If the buffer instruction is a pointer assignment instruction, then the modified compiler inserts code to trace the bounds information (step 342). If the buffer instruction is a store pointer instruction, then the modified compiler inserts code to store the bounds information in the bounds table (step 343). If the buffer instruction is a load pointer instruction, then the modified compiler inserts code to load the bounds information from the bounds table (step 344). If the buffer instruction is a pointer dereference instruction, then the modified compiler inserts code to check the access against bounds information to determine if the access is in-bounds (step 345). The modified compiler then continues the normal (unmodified) steps of optimization and code generation (step 350), and generates the output file 360.

In an embodiment, when an array is de-allocated, for example via a call to the standard C function free( ), the bounds information entries will be freed, in both the hardware bounds table and the in-memory bounds table. To free the bounds information entries, the compiler inserts a freeBI call after system memory free call in the output file. As a result of the call, all the BI entries are traversed and checked, and an entry is freed if its start address belongs to the freed buffer, i.e., is within the memory range allocated to the buffer. Since the entire bounds table has to be traversed, this can be a costly operation in terms of performance.

Figure 4:
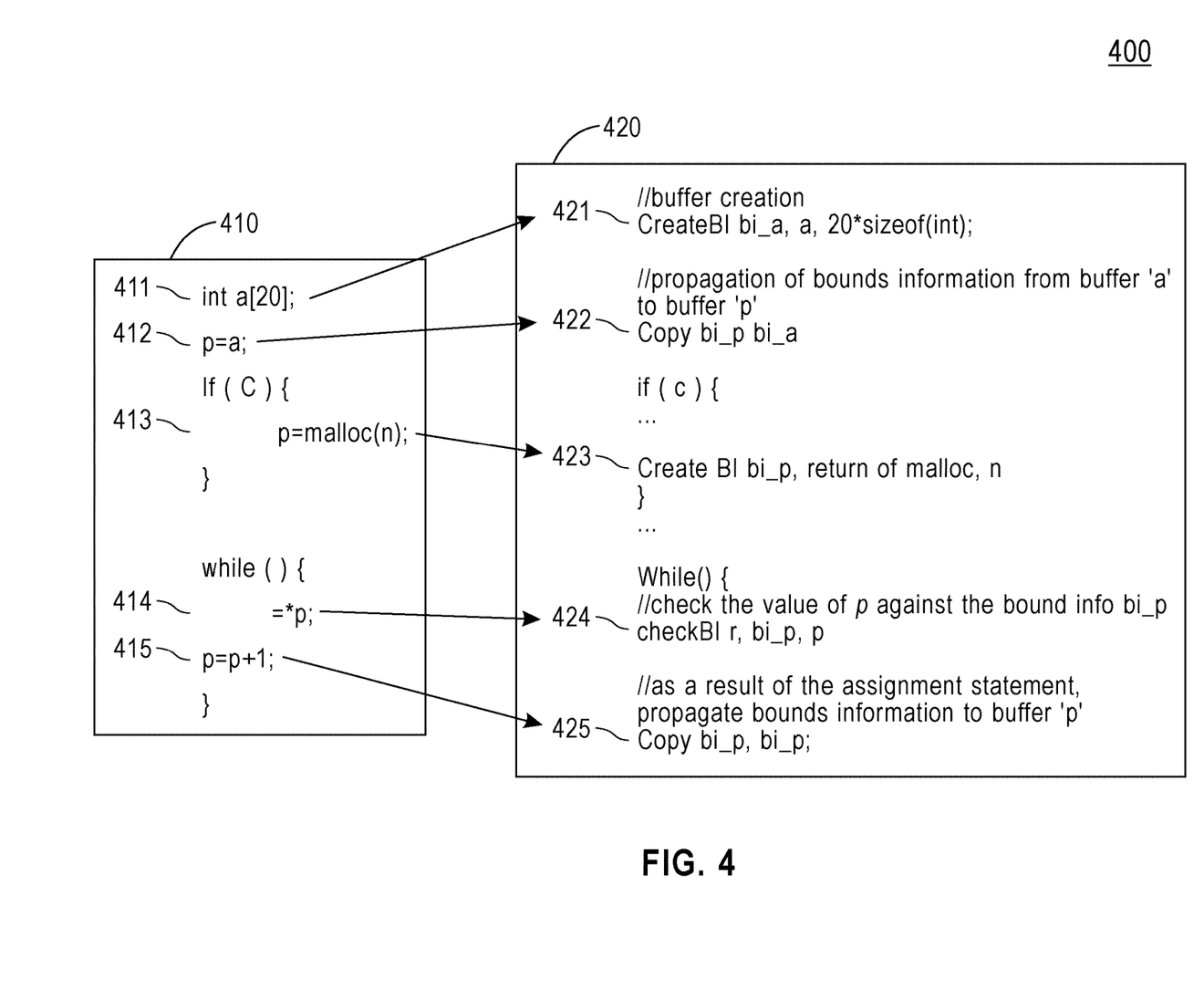
FIG. 4 is an example of a section of code, illustrating the insertion of bounds checking instructions into the execution flow, in accordance with an embodiment of the present invention.

FIG. 4 is an example of the bounds-checking functional unit instructions, generally designated 400, inserted transparently by a compiler, for example, a C compiler, modified to check for a buffer overflow as shown in FIG. 3. In an embodiment, the compiler inserts bounds-checking functional unit bounds management and bounds checking instructions 420 while compiling C-language programming instructions 410. In an embodiment, instruction 411, a declaration of an array that creates a buffer in memory, causes the compiler to insert the createBI instruction 421 into the compiler output file. Instruction 412 assigns the array from instruction 411 to a variable. When a pointer expression is assigned to another pointer variable, the bounds of the valid addresses for the new variable is the same as the original variable. In this case, an instruction is inserted by the compiler in line 422 to propagate the buffer information from the array "a" to the new array "p." Instruction 413, a memory allocation (malloc) function call, also creates a buffer in memory, and the compiler again inserts the createBI instruction (line 423) into the compiler output file to save the buffer information. Instruction 414 and 415 reference a memory buffer using pointer logic within a code loop. Instruction 414 causes the compiler to insert the checkBI instruction as shown in step 424, to ensure that the location pointed to is within the bounds of the buffer as the pointer is incremented. Finally, instruction 415 increments the value of the pointer and assigns the new value back to the same pointer. The compiler inserts the copy instruction in step 425 to copy the bounds information for the new assignment. In this case, however, the bounds information for the pointer "p" remains the same, since it is the same pointer variable. The copy instruction in step 425 will be eliminated by the compiler in an optimizing pass.

Figure 5A:
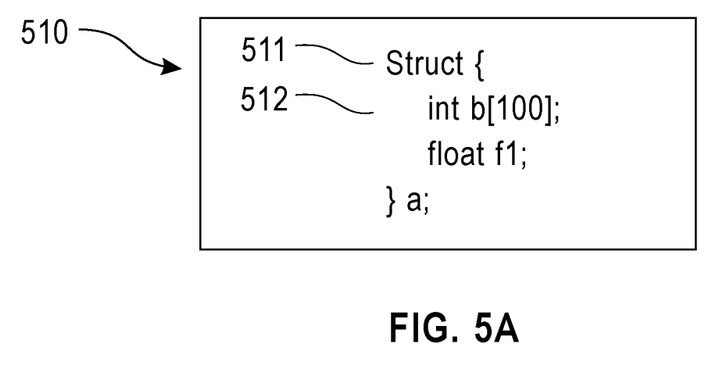
FIG. 5a illustrates a special case that must be handled by the compiler and the bounds-checking functional unit, in accordance with an embodiment of the present invention.

In an embodiment, the compiler and the bounds-checking functional unit handle a special case that occurs when a buffer is contained within a structure. FIG. 5a illustrates an example of the declaration of a structure, generally designated 510. In line 511, a declaration creates a structure, a. In line 512, a buffer, or array of integers, b, is created within structure a. In this case, it can be checked that the pointer does not overflow the structure (e.g., a), but not that the pointer does not overflow the array (e.g., b). The issue is that the same base address applies to both the array and the structure, but the array and the structure have different sizes to be entered into the bounds table. In an embodiment, the solution is for the compiler to trace the type information of the pointer and add it into the bounds table entry, creating two separate entries, one for the structure and one for the array of integers within the structure.

In an embodiment, the compiler and the bounds-checking functional unit can be optimized to handle a special case that occurs when a pointer dereference occurs within an instruction loop in the code. Since the pointer dereference instruction will cause the compiler to insert the checkBI instruction into the loop, the execution time of each iteration of the loop will be increased by the time it takes to fetch and decode the checkBI instruction. This overhead can be reduced by moving the checkBI instruction out of the loop.

Figure 5B:
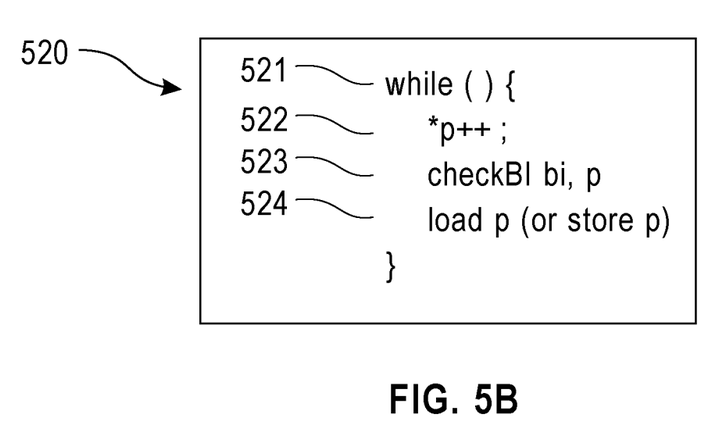
FIG. 5b illustrates a sample of code generated by a compiler, for example, the compiler in FIG. 3, in accordance with an embodiment of the present invention.
Figure 5C:
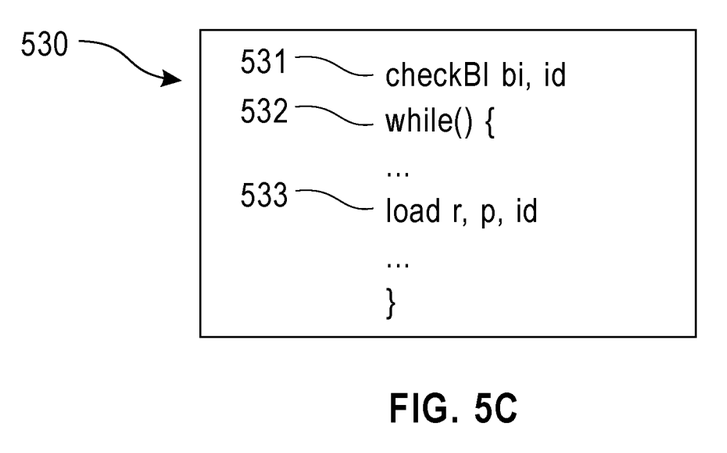
FIG. 5c is an example of the sample of code generated by a compiler as in FIG. 5b that has been optimized, in accordance with an embodiment of the present invention.

FIGS. 5b and 5c illustrate samples of code, generally designated 520, generated by a compiler, for example, the compiler in FIG. 3, to optimize the issue of a pointer dereference occurring within an instruction loop in the code. FIG. 5b, is an example where a pointer dereference (step 524) and a pointer increment (step 522) occur inside a loop (step 521). The operand bi of step 523, however, is loop invariant and the value p for the two instructions (steps 523 and 524) are the same. In an embodiment, the solution is for the compiler to instead introduce another instruction that gets inserted before the loop that tells the bounds-checking functional unit to validate the corresponding dereference each time a particular instruction in the loop executes. FIG. 5c is an example of the same function as in FIG. 5b, generally designated 530, but here the compiler inserted the checkBI instruction (step 531) before the loop, and pairs the instruction in step 531 to the pointer dereference in step 533 by the use of the operand "id." Therefore, although the validation of the pointer dereference in step 533 occurs on each iteration of the loop, the checkBI instruction, now positioned before the loop, is only fetched once. By removing the instruction from inside the loop in step 532, the time to perform the instruction fetch and decode of the checkBI instruction is saved for each iteration of the loop, improving the performance of the bounds checking function.

Figure 6A:
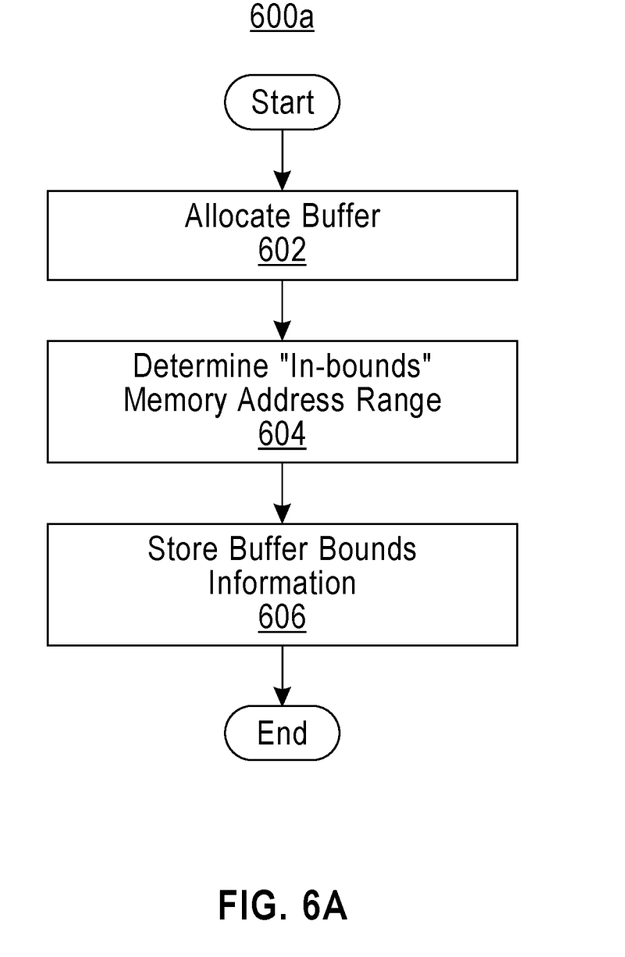
FIG. 6a is a flowchart depicting operational steps of part "a" of the bounds check program, on a computing device within the distributed data processing environment of FIG. 1, for bounds checking for protecting against out-of-bounds buffer references, in accordance with an embodiment of the present invention.

FIG. 6a is a flow chart diagram of workflow 600a depicting operational steps for bounds check program 112 for bounds checking for protecting against out-of-bounds buffer references. In an embodiment, bound check program 112 may be a compiler as shown in FIG. 3 and described above. In an alternative embodiment, the steps of workflow 600a may be performed by any other program while working with bounds check program 112. It should be appreciated that embodiments of the present invention provide at least for checking array bounds information when a buffer is dereferenced (accessed) and determining "in-bounds" memory address ranges. However, FIG. 6 provides only an illustration of one implementation and does not imply any limitations with regard to the environments in which different embodiments may be implemented. Many modifications to the depicted environment may be made by those skilled in the art without departing from the scope of the invention as recited by the claims.

Bounds check program 112 allocates buffer (step 602). At step 602, bounds check program 112 allocates a buffer from the available memory pool. For example, bounds check program 112 may allocate a buffer through an array declaration, or a memory allocation (malloc) instruction.

Bounds check program 112 determines "in-bounds" memory address range (step 604). In an embodiment, bounds check program 112 analyzes the buffer allocation and determines the starting address of the buffer and the size of the buffer. Bounds check program 112 uses this information to establish the address range of the buffer. In another embodiment, bounds check program 112 determines the starting address of the buffer and the ending address of the buffer, and uses this information to establish the address range of the buffer. In an embodiment, bounds check program 112 may use any combination of starting address, ending address, buffer size, or any other parameter to determine the address range of the buffer.

Bounds check program 112 stores buffer bounds information (step 606). In an embodiment, bounds check program 112 offloads the bounds information storage from the main processor to the bounds-checking functional unit. This prevents the bounds information storage from negatively impacting the performance of the main processor.

Bounds check program 112 repeats steps 602 through 606 each time a new buffer is allocated.

Figure 6B:
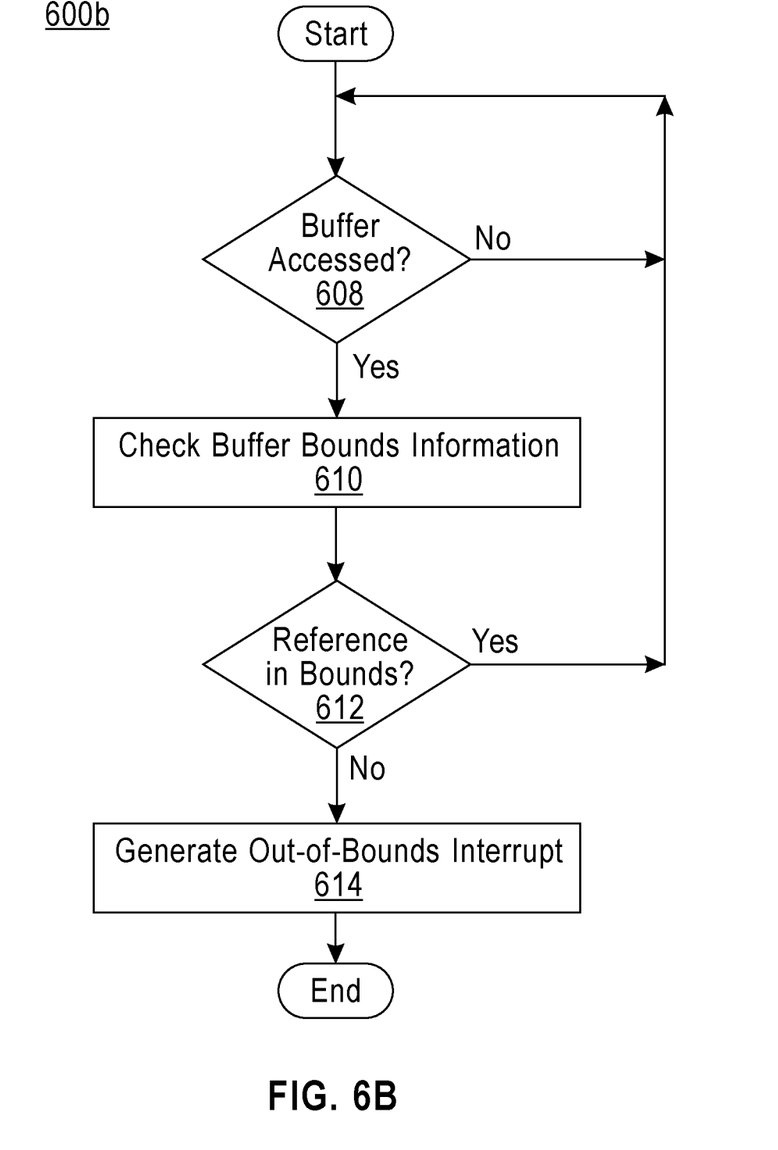
FIG. 6b is a flowchart depicting operational steps of part "b" of the bounds check program, on a computing device within the distributed data processing environment of FIG. 1, for bounds checking for protecting against out-of-bounds buffer references, in accordance with an embodiment of the present invention.

FIG. 6b is a flow chart diagram of workflow 600b depicting operational steps for part "b" of bounds check program 112 for bounds checking for protecting against out-of-bounds buffer references. It should be appreciated that embodiments of the present invention provide at least for checking array bounds information when a buffer is dereferenced (accessed) and determining "in-bounds" memory address ranges. However, FIG. 6b provides only an illustration of one implementation and does not imply any limitations with regard to the environments in which different embodiments may be implemented. Many modifications to the depicted environment may be made by those skilled in the art without departing from the scope of the invention as recited by the claims.

Bounds check program 112 determines buffer accessed (step 608). In an embodiment, bounds check program 112 monitors memory accesses to determine that a buffer access is about to take place. In an embodiment, if bounds check program 112 determines that a buffer access is about to take place, for example, an array is to be dereferenced, then bounds check program 112 will proceed to step 610. If bounds check program 112 does not determine that a buffer access is about to take place, then bounds check program 112 will return to step 608.

Bounds check program 112 checks buffer bounds information (step 610). If bounds check program 112 determines that a buffer access is about to take place, for example, an array is to be dereferenced, then bounds check program 112 checks the buffer bounds information to determine if the access is within the address range of the buffer as determined in step 604. In an embodiment, bounds check program 112 utilizes the bounds-checking functional unit to check the memory address of the buffer access against the buffer bounds information previously stored in the bounds information in step 606.

Bounds check program 112 determines reference in bounds (step 612). At step 612, bounds check program 112 determines if the reference to the buffer in step 610 is within the address range of the buffer as determined in step 604. In an embodiment, bounds check program 112 compares the address to the bounds information retrieved in step 610 to determine if the reference to the buffer is within the address range of the buffer. In an embodiment, if the bounds information for the accessed buffer is no longer located in a bounds register or in a hardware bounds table, then the bounds-checking functional unit will retrieve the bounds information for the buffer from the in-memory bounds table and insert it into the hardware bounds table using the least recently used algorithm as previously discussed. In an embodiment, if bounds check program 112 determines that the reference to the buffer is within the address range of the buffer, then bounds check program 112 returns to step 608. If bounds check program 112 determines that the reference to the buffer is not within the address range of the buffer, then bounds check program 112 continues to step 614.

Bounds check program 112 generates out-of-bounds interrupt (step 614). At step 614, bounds check program 112 signals computing device 110 that a buffer overrun error has occurred. In an embodiment, the signal is a trap generated by bounds check program 112 for the out-of-bounds buffer access. In an embodiment, this trap is a hardware interrupt that interrupts the main processor to indicate a buffer overflow error. In another embodiment, the trap is a flag set in, for example, a condition code register to allow the program to test the condition code register through another instruction. In an embodiment, bounds check program 112 uses the signal to alert a user that an error has occurred. In an embodiment, bounds check program 112 uses the signal to stop a program that is currently executing on computing device 110.

Figure 7:
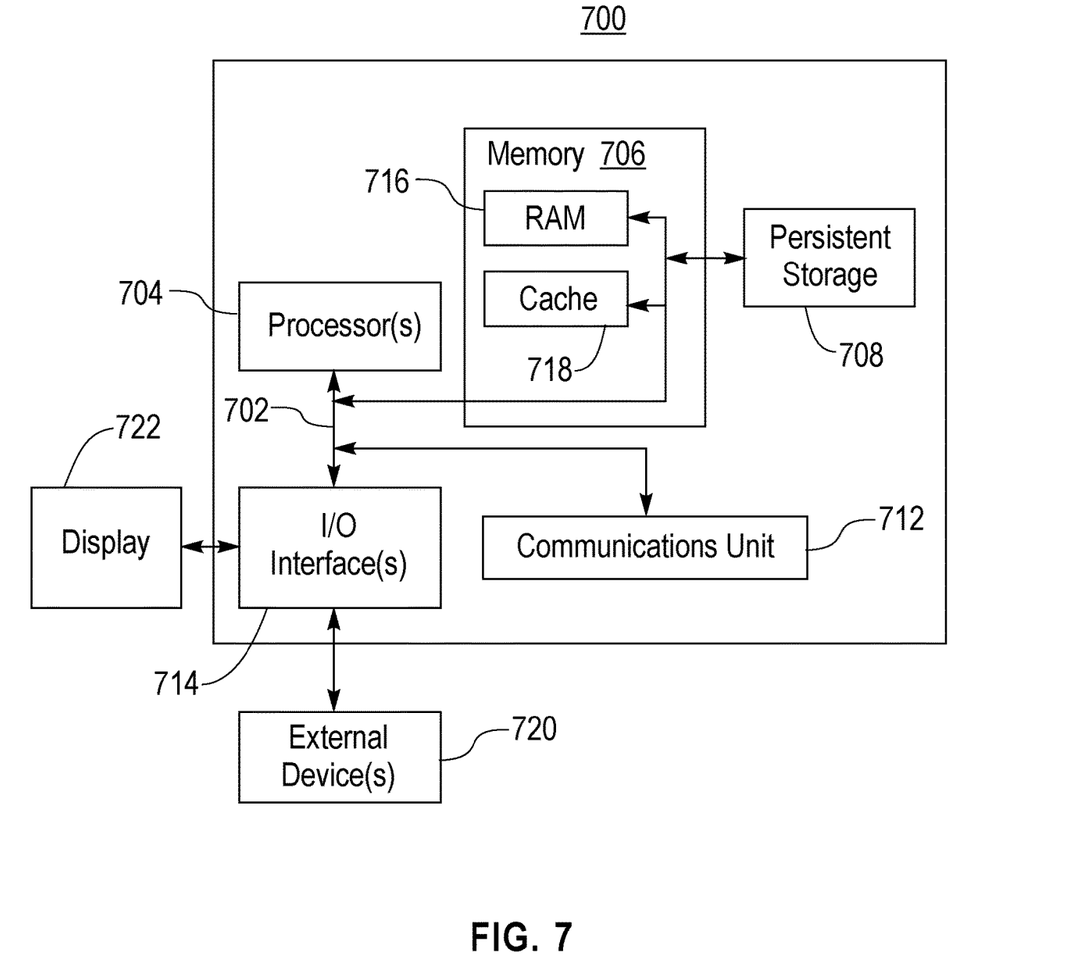
FIG. 7 depicts a block diagram of components of the computing device executing the bounds check program within the distributed data processing environment of FIG. 1, in accordance with an embodiment of the present invention.

FIG. 7 is a block diagram depicting components of computing device 110 suitable for bounds check program 112, in accordance with at least one embodiment of the invention. FIG. 7 displays the computer 700, one or more processor(s) 704 (including one or more computer processors), a communications fabric 702, a memory 706 including, a random-access memory (RAM) 716, and a cache 718, a persistent storage 708, a communications unit 712, I/O interfaces 714, a display 722, and external devices 720. In an embodiment, the one or more processor(s) 704 includes bounds-checking functional unit 220. It should be appreciated that FIG. 7 provides only an illustration of one embodiment and does not imply any limitations with regard to the environments in which different embodiments may be implemented. Many modifications to the depicted environment may be made.

As depicted, the computer 700 operates over the communications fabric 702, which provides communications between the computer processor(s) 704, memory 706, persistent storage 708, communications unit 712, and input/output (I/O) interface(s) 714. The communications fabric 702 may be implemented with any architecture suitable for passing data or control information between the processors 704 (e.g., microprocessors, communications processors, and network processors), the memory 706, the external devices 720, and any other hardware components within a system. For example, the communications fabric 702 may be implemented with one or more buses.

The memory 706 and persistent storage 708 are computer readable storage media. In the depicted embodiment, the memory 706 comprises a RAM 716 and a cache 718. In general, the memory 706 can include any suitable volatile or non-volatile computer readable storage media. Cache 718 is a fast memory that enhances the performance of processor(s) 704 by holding recently accessed data, and data near recently accessed data, from RAM 716.

Program instructions for bounds check program 112 may be stored in the persistent storage 708, or more generally, any computer readable storage media, for execution by one or more of the respective computer processors 704 via one or more memories of the memory 706. The persistent storage 708 may be a magnetic hard disk drive, a solid-state disk drive, a semiconductor storage device, read only memory (ROM), electronically erasable programmable read-only memory (EEPROM), flash memory, or any other computer readable storage media that is capable of storing program instruction or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer readable storage medium that is also part of persistent storage 708.

The communications unit 712, in these examples, provides for communications with other data processing systems or devices. In these examples, the communications unit 712 includes one or more network interface cards. The communications unit 712 may provide communications through the use of either or both physical and wireless communications links. In the context of some embodiments of the present invention, the source of the various input data may be physically remote to the computer 700 such that the input data may be received, and the output similarly transmitted via the communications unit 712.

The I/O interface(s) 714 allows for input and output of data with other devices that may be connected to computer 700. For example, the I/O interface(s) 714 may provide a connection to external device(s) 720 such as a keyboard, a keypad, a touch screen, a microphone, a digital camera, and/or some other suitable input device. External device(s) 720 can also include portable computer readable storage media such as, for example, thumb drives, portable optical or magnetic disks, and memory cards. Software and data used to practice embodiments of the present invention, e.g., bounds check program 112, can be stored on such portable computer readable storage media and can be loaded onto persistent storage 708 via the I/O interface(s) 714. I/O interface(s) 714 also connect to a display 722.

Display 722 provides a mechanism to display data to a user and may be, for example, a computer monitor. Display 722 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. An apparatus comprising:
   one or more processor cores configured to process data; and
   a bounds-checking functional unit in each processor core of the one or more processor cores configured to manage a bounds information for one or more memory buffers, wherein (i) the bounds information includes, at least, an address range for each memory buffer of the one or more memory buffers and (ii) each bounds-checking functional unit in each of the one or more processor cores validates a dereferenced pointer to a memory buffer of the one or more memory buffers based on an address range of the dereferenced pointer and an address range of the memory buffer accessed by the dereferenced pointer.

2. The apparatus of claim 1, wherein the bounds-checking functional unit for each processor core of the one or more processor cores further comprises one or more bounds tables, wherein each bounds table of the one or more bounds tables is configured to hold the bounds information for each memory buffer of the one or more memory buffers.

3. The apparatus of claim 2, wherein the one or more bounds tables contain at least one bounds table for each thread that each processor core of the one or more processor cores can simultaneously execute.

4. The apparatus of claim 1, wherein the bounds-checking functional unit for each processor core of the one or more processor cores further comprises one or more bounds register files, wherein each bounds register file of the one or more bounds register files is configured to hold the bounds information for at least one memory buffer of the one or more memory buffers.

5. The apparatus of claim 4, wherein the one or more bounds register files contains at least one bounds register file for each thread that each processor core of the one or more processor cores can simultaneously execute.

6. The apparatus of claim 1, wherein each processor core of the one or more processor cores further comprises an instruction decode unit, wherein the instruction decode unit is configured to decode bounds information instructions for the bounds-checking functional unit in each processor core of the one or more processor cores.

7. The apparatus of claim 1, wherein each processor core of the one or more processor cores further comprises an instruction sequencing unit, wherein the instruction sequencing unit is configured to issue bounds information instructions to the bounds-checking functional unit in each processor core of the one or more processor cores.

8. A computer-implemented method for protecting against out-of-bounds buffer references, the computer implemented method comprising:
responsive to determining that a buffer is allocated, storing, by one or more computer processors, an address range of the buffer;
validating, by one or more processors, a dereferenced pointer based on an address range of the dereferenced pointers and an address range of a memory buffer accessed by the dereferenced pointer;
responsive to determining that the dereferenced pointer is used to compute an address for an operation, determining, by one or more computer processors, if the address for the operation is within the address range associated with the dereferenced pointer, wherein the operation is selected from the group consisting of load and store; and
responsive to determining that the address for the operation is not within the address range associated with the dereferenced pointer, signaling, by one or more computer processors, that an error has occurred.

9. The computer-implemented method of claim 8, wherein storing, by one or more computer processors, the address range of the buffer comprises:
receiving, by one or more computer processors, a starting address in memory of the buffer;
receiving, by one or more computer processors, a size of the buffer; and
determining, by one or more computer processors, the address range for the buffer based on the starting address in memory of the buffer and the size of the buffer.

10. The computer-implemented method of claim 8, wherein storing, by one or more computer processors, the address range of the buffer comprises:
receiving, by one or more computer processors, a starting address in memory of the buffer;
receiving, by one or more computer processors, an ending address in memory of the buffer; and
determining, by one or more computer processors, the address range for the buffer based on the starting address in memory of the buffer and the ending address in memory of the buffer.

11. The computer-implemented method of claim 8, wherein signaling, by one or more computer processors, that the error has occurred comprises generating an interrupt.

12. The computer-implemented method of claim 11, wherein generating the interrupt further comprises alerting a user that the error has occurred.

13. The computer-implemented method of claim 8, wherein signaling, by one or more computer processors, that the error has occurred comprises setting a flag in a register.

14. The computer-implemented method of claim 13, wherein setting the flag in the register further comprises alerting a user that the error has occurred.

15. A computer program product for protecting against out-of-bounds buffer references, the computer implemented method comprising:
one or more computer readable storage media and program instructions stored on the one or more computer readable storage media, the program instructions comprising:
responsive to determining that a buffer is allocated, program instructions to store an address range of the buffer;
program instructions to validate a dereferenced pointer based on an address range of the dereferenced pointers and an address range of a memory buffer accessed by the dereferenced pointer;
responsive to determining that the dereferenced pointer is used to compute an address for an operation, program instructions to determine if the address for the operation is within the address range associated with the dereferenced pointer, wherein the operation is selected from the group consisting of load and store; and
responsive to determining that the address for the operation is not within the address range associated with the dereferenced pointer, program instructions to signal that an error has occurred.

16. The computer program product of claim 15, wherein storing, by one or more computer processors, the address range of the buffer comprises:
receiving, by one or more computer processors, a starting address in memory of the buffer;
receiving, by one or more computer processors, a size of the buffer; and
determining, by one or more computer processors, the address range for the buffer based on the starting address in memory of the buffer and the size of the buffer.

17. The computer program product of claim 15, wherein storing, by one or more computer processors, the address range of the buffer comprises:
receiving, by one or more computer processors, a starting address in memory of the buffer;
receiving, by one or more computer processors, an ending address in memory of the buffer; and
determining, by one or more computer processors, the address range for the buffer based on the starting address in memory of the buffer and the ending address in memory of the buffer.

18. The computer program product of claim 15, wherein signaling, by one or more computer processors, that the error has occurred comprises generating an interrupt.

19. The computer program product of claim 18, wherein generating the interrupt further comprises alerting a user that the error has occurred.

20. The computer program product of claim 15, wherein signaling, by one or more computer processors, that the error has occurred comprises setting a flag in a register.

* * * * *